United States Patent
Noda et al.

(10) Patent No.: US 7,412,382 B2
(45) Date of Patent: Aug. 12, 2008

(54) VOICE INTERACTIVE SYSTEM AND METHOD

(75) Inventors: Takuya Noda, Kawasaki (JP); Nobuyuki Washio, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 806 days.

(21) Appl. No.: 10/687,594

(22) Filed: Oct. 20, 2003

(65) Prior Publication Data

US 2004/0083107 A1 Apr. 29, 2004

(30) Foreign Application Priority Data

Oct. 21, 2002 (JP) .............................. 2002-306299

(51) Int. Cl.
 G10L 15/00 (2006.01)
 G10L 15/20 (2006.01)
 G10L 21/00 (2006.01)
 G10L 11/00 (2006.01)
 H04M 1/64 (2006.01)
 H04M 3/42 (2006.01)

(52) U.S. Cl. ....................... 704/233; 704/246; 704/275; 379/88.01; 379/208.01

(58) Field of Classification Search ................. 704/233, 704/246, 275; 379/88.01, 208.01
See application file for complete search history.

(56) References Cited

U.S. PATENT DOCUMENTS 5,765,130 A * 6/1998 Nguyen ..................... 704/233
 5,937,379 A   8/1999 Takagi
 5,956,675 A * 9/1999 Setlur et al. ................ 704/231

(Continued)

FOREIGN PATENT DOCUMENTS

JP  57-212495  12/1982

(Continued)

OTHER PUBLICATIONS

Strom et al, "Intelligent Barge-in in Conversational Systems", Proceedings of the 6th International Conference on Spoken Language Processing, ICSLP-2000, vol. 2, Beijing, Chine, 2000, pp. 652-655.*

(Continued)

*Primary Examiner*—Richemond Dorvil
*Assistant Examiner*—Dorothy S Siedler
(74) *Attorney, Agent, or Firm*—Staas & Halsey LLP (57) ABSTRACT

A voice interactive system includes an acoustic processing part 11 for performing acoustic signal processing with respect to an input voice signal, a voice recognizing part 12 for recognizing the contents of a voice contained in the voice signal after being subjected to the acoustic signal processing, a voice interacting part 13 for transmitting information to a user by using a voice output or a combination of a voice output and another information transmission unit based on the contents of the voice, and a barge-in control part 14 having a barge-in function of suspending the transmission of information based on an input of the acoustic processing part 11, an output thereof, or an input signal from an external input, in the course of transmission of information, wherein the barge-in control part 14 detects at least one feature value from the input signal from the input or the output of the acoustic processing part 11 or the external input, and determines the effectiveness of the barge-in function based on the at least one feature value.

6 Claims, 7 Drawing Sheets

U.S. PATENT DOCUMENTS

| | | | |
|---|---|---|---|
| 6,725,199 B2 * | 4/2004 | Brittan et al. | 704/258 |
| 6,941,268 B2 * | 9/2005 | Porter et al. | 704/270 |
| 6,952,672 B2 * | 10/2005 | Smith | 704/226 |
| 7,143,039 B1 * | 11/2006 | Stifelman et al. | 704/270 |

FOREIGN PATENT DOCUMENTS

| | | |
|---|---|---|
| JP | 2-3520 | 10/1983 |
| JP | 59-53400 | 4/1984 |
| JP | 62-150295 | 7/1987 |
| JP | 2-103599 | 4/1990 |
| JP | 7-175498 | 7/1995 |
| JP | 9-252268 | 9/1997 |
| JP | 2003-248498 | 9/2003 |

OTHER PUBLICATIONS

Japanese Patent Office Action, mailed Mar. 29, 2007, and issued in priority Japanese Patent Application No. 2002-306299.

Partial English translation of the Japanese Patent Office Action issued in corresponding Japanese Patent Application No. 2002-306299 on Jul. 18, 2006.

* cited by examiner

VOICE INTERACTIVE SYSTEM AND METHOD

BACKGROUND OF THE INVENTION

1. Field of the Invention

The present invention relates to a voice interactive system for transmitting information to a user by using a voice output or a combination of a voice output and another information transmission unit in accordance with the contents of a user's voice input. In particular, the present invention relates to a voice interactive system having a barge-in function of processing a user's interrupt voice input by suspending the transmission of information, in the case where there is an interrupt by a user voice in the course of transmission of information to the user by using a voice output or a combination of a voice output and another information transmission unit.

2. Description of the Related Art

With the rapid advancement of computer technology, the technique regarding the processing of a voice signal is also advancing rapidly. Along with this, in a voice interactive system such as a voice portal that is being rapidly spread through the Internet or the like, a user and a system perform a pseudo interaction, whereby information desired by a user is provided through a voice output such as a synthetic voice and the like. Furthermore, next-generation mobile telephones and mobile terminals (PDA, etc.) can deal with image information in addition to a voice signal. Therefore, the future advancement of a voice interactive system providing multimedia information containing a combination of a voice and an image is also expected.

Recently, a voice portal that is being spread on the market is likely to have a barge-in function allowing a user interrupt to utter a voice even in the course of voice guidance from a portal site (voice interactive system), for the purpose of enhancing usability. The barge-in function detects the commencement of a user's voice input when a user voice is input to a system via a communication line or the like, suspends the guidance or the like through a voice output, and urges a user to input a voice. Herein, when the input to the system is only a user voice, the commencement of a user's voice input can be detected exactly, for example, by monitoring the fluctuation of an input power, and the guidance and the like through a voice output can be suspended. Therefore, the barge-in function is operated normally.

However, actually, a user voice is input to the system under the condition of being superimposed with a line echo generated when the guidance and the like through a voice output from the system is reflected from a communication line system and returns, an acoustic echo generated when a guidance voice of the system by a hand-free telephone or the like enters a receiver from a transmitter, stationary or non-stationary environment noise from a user peripheral environment, noise of a communication line system, and the like. In order to solve such a problem, echo suppression processing and noise suppression processing based on acoustic processing are generally performed.

For example, JP 9(1997)-252268 A discloses a voice interactive system capable of eliminating an echo caused by the return of a voice by analyzing the spectrum of an input voice.

As described above, an echo is generally suppressed by an echo canceller using various methods. However, an echo cannot be suppressed completely depending upon a communication line system, and an echo may remain in some cases.

Furthermore, noise is generally suppressed by a noise canceller. However, stationary noise can be suppressed effectively, whereas non-stationary noise is difficult to be suppressed.

Furthermore, parameters are often adjusted in an echo canceller or a noise canceller so as to enhance a suppression effect. However, the adjustment of parameters may distort a user's voice input, resulting in a decrease in a voice recognition ratio.

In the case where the levels of a residual echo and non-stationary noise generated for the above reasons are high, a conventional voice interactive system erroneously determines a residual echo and non-stationary noise to be a user's voice input, by using a barge-in function. Therefore, the guidance through a voice output and the like are suspended, and a residual echo and non-stationary noise are erroneously recognized by voice recognition, which is one of the factors causing the malfunction of the voice interactive system.

SUMMARY OF THE INVENTION

Therefore, with the foregoing in mind, it is an object of the present invention to provide a voice interactive system and method highly convenient for a user, by suppressing unexpected barge-in caused by various echoes and noise and the malfunction of a system due to the erroneous recognition caused by the barge-in.

In order to achieve the above-mentioned object, a voice interactive system of the present invention includes: an acoustic processing part for performing acoustic signal processing with respect to an input voice signal; a voice recognizing part for recognizing contents of a voice contained in the voice signal after being subjected to the acoustic signal processing; a voice interacting part for transmitting information to a user through a voice output or a combination of the voice output and another information transmission unit based on the contents of the voice; and a barge-in control part having a barge-in function of suspending transmission of information by an input or an output of the acoustic processing part, or an input signal from an external input in the course of the transmission of information, wherein the barge-in control part detects one or more feature values from the input or the output of the acoustic processing part, or the input signal from the external input, and determines whether or not the barge-in function is set to be effective based on the one or more feature values.

Because of the above-mentioned configuration, the effectiveness of the barge-in function in the voice recognizing part can be determined in accordance with various feature values detected in the barge-in control part, and unexpected barge-in caused by noise, an echo, and the like can be suppressed, and erroneous recognition caused by determining a noise section as a user voice section can be avoided. Consequently, a malfunction of the voice interactive system can be prevented.

Furthermore, in the voice interactive system of the present invention, it is preferable that at least one of the one or more feature values is a noise feature value, and the barge-in function is set to be non-effective in a case where the noise feature value exceeds a predetermined threshold value. This is because whether or not barge-in should be performed can be determined based on the magnitude of the power of a noise signal and the like.

Furthermore, in the voice interactive system of the present invention, it is preferable that at least one of the one or more feature values is a S/N of a user voice, and the barge-in function is set to be effective in a case where the S/N exceeds a predetermined threshold value. This is because whether or not barge-in should be performed can be determined based on the magnitude of the S/N of a noise signal.

Furthermore, in the voice interactive system of the present invention, it is preferable that at least one of the one or more feature values is positional information of the user detected from the input signal from the external input, an environment evaluation value of a position of the user is calculated based on the positional information and environmental information, and the barge-in function is set to be non-effective in the case where the environment evaluation value exceeds a predetermined value. This is because whether or not an environment has a lot of noise signals can be determined based on the current position of a user, and whether or not barge-in should be performed can be determined.

Furthermore, in the voice interactive system of the present invention, it is preferable that the voice interacting part notifies the user of an effective/non-effective state of the barge-in function using at least one of a voice and another information transmission unit. This is because whether or not a user can input in the course of a voice output can be determined.

Furthermore, a voice interactive method of the present invention includes: a first operation of performing acoustic signal processing with respect to an input voice signal; a second operation of recognizing contents of a voice contained in the voice signal after being subjected to the acoustic signal processing; a third operation of transmitting information to a user through a voice output or a combination of the voice output and another information transmission unit based on the contents of the voice; and a fourth operation having a barge-in function of suspending transmission of information by an input or an output in the first operation or an input signal from an external input in the course of the transmission of information, wherein in the fourth operation, one or more feature values are detected from the input or the output in the first operation or the input signal from the external input, and whether or not the barge-in function is set to be effective is determined based on the one or more feature values.

Furthermore, the present invention relates to a computer program product in which a computer-executable program for realizing a voice interactive method is recorded on a medium. More specifically, the present invention relates to a program for allowing a computer to execute the processing including: a first operation of performing acoustic signal processing with respect to an input voice signal; a second operation of recognizing contents of a voice contained in the voice signal after being subjected to the acoustic signal processing; a third operation of transmitting information to a user through a voice output or a combination of the voice output and another information transmission unit based on the contents of the voice; and a fourth operation having a barge-in function of suspending transmission of information by an input or an output in the first operation or an input signal from an external input in the course of the transmission of information, wherein in the fourth operation, the program detects one or more feature values from the input or the output in the first operation or the input signal from the external input, and determines whether or not the barge-in function is set to be effective based on the one or more feature values.

Because of the above-mentioned configuration, by allowing the program to be loaded onto a computer, whether or not the barge-in function should be set to be effective can be determined based on various detected feature values, and unexpected barge-in caused by noise, an echo, and the like can be suppressed. In addition, erroneous recognition caused by determining a noise section as a user voice section can be avoided. Consequently, a voice interactive system is realized, capable of preventing a malfunction of the voice interactive system.

These and other advantages of the present invention will become apparent to those skilled in the art upon reading and understanding the following detailed description with reference to the accompanying figures.

DESCRIPTION OF THE PREFERRED EMBODIMENTS

Figure 1:
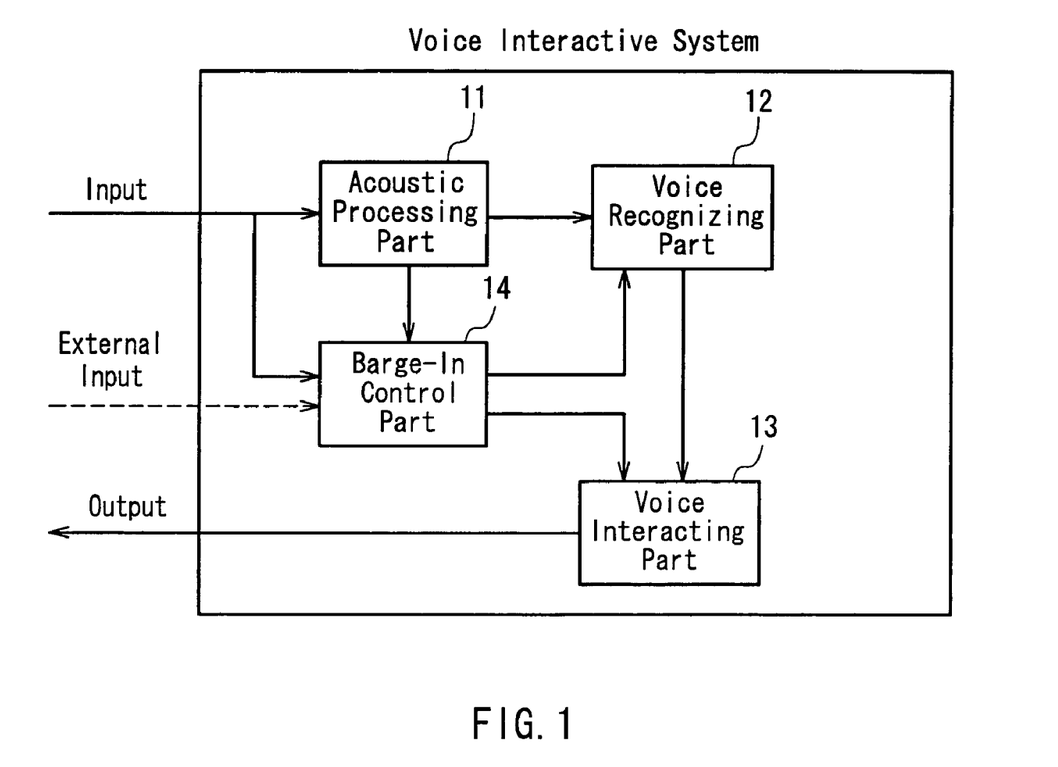
FIG. 1 is a view showing a configuration of a voice interactive system according to an embodiment of the present invention.

Hereinafter, a voice interactive system according to an embodiment of the present invention will be described with reference to the drawings. FIG. 1 is a view showing a basic configuration of the voice interactive system according to the embodiment of the present invention.

In FIG. 1, reference numeral 11 denotes an acoustic processing part for performing acoustic signal processing with respect to an input voice signal, 12 denotes a voice recognizing part for recognizing the contents of a voice contained in the input voice signal, and providing a barge-in function of suspending the transmission of information through a voice signal input by a user in the course of the transmission of information containing a voice output by a synthetic voice or the like, and 13 denotes a voice interacting part for transmitting information to a user through a voice output or a combination of a voice output and another information transmission unit.

Furthermore, reference numeral 14 denotes a barge-in control part for detecting at least one feature value from an input voice signal and determining whether or not the barge-in function is set to be effective based on at least one feature value.

First, the acoustic processing part 11 performs acoustic signal processing with respect to an input voice signal, thereby suppressing various noises contained in the voice signal and enhancing the precision of voice recognition in the voice recognizing part 12. Herein, the noise is considered to be echo noise caused by the return of a voice such as a line echo and an acoustic echo, as well as environment noise, telephone line network noise, and the like, for example, in the case of a voice portal system using a telephone line.

The environment noise refers to noise superimposed with various voice signals generated in an environment surrounding the place where a user is on the telephone. Furthermore, the telephone line noise refers to noise superimposed with various kinds of noise signals generated on a public line network, in particular, on a transmission path and a switchboard.

Furthermore, the line echo refers to noise superimposed with a voice output provided to a user through a voice portal, which is reflected on a telephone line. Furthermore, for example, in the case of using a hand-free telephone, a voice output from a voice portal is enhanced and reproduced by a transmitter of a telephone; as a result, the reproduced voice output enters a receiver due to the vibration of a housing, or is reflected from a ceiling, a wall, or a floor in a room to enter the receiver. The acoustic echo refers to noise superimposed with such a reproduced voice output.

In the acoustic processing part 11, in order to suppress the above-mentioned noise contained in an input voice signal, a well-known noise canceller technique is often used. A representative example of the noise canceller technique includes a spectrum subtraction method. According to the spectrum subtraction method, an amplitude spectrum of stationary noise is presumed in a noise section, and noise is suppressed by eliminating the presumed amplitude spectrum from the noise section and a voice section superimposed with the noise. It should be noted that the noise canceller technique is not limited to the above.

Furthermore, in the acoustic processing part 11, the line echo and the acoustic echo contained in an input voice signal are often suppressed by using a well-known echo canceller technique. A representative example of the echo canceller technique includes an adaptive filter. The adaptive filter is composed of a digital filter called a FIR filter. The adaptive filter suppresses an echo while updating, whenever necessary, an adaptive filter coefficient so as to minimize a square error of a reference voice (voice output signal in the present embodiment) that is a voice signal to be an echo generation source and an input voice signal.

Next, the voice recognizing part 12 receives an output from the acoustic processing part 11 with noise suppressed. The voice recognizing part 12 compares a feature value of the output from the acoustic processing part 11 with a predetermined threshold value to detect a user voice signal section contained in the output from the acoustic processing part 11.

For example, the following detection method is considered. A section, in which a amplitude or a power of an input voice signal exceeds a predetermined threshold value, is determined to be a user voice section, and a section, in which the amplitude or the power of an input voice signal does not exceed a predetermined threshold value is determined to be a noise section. It is preferable that the feature value of the output from the acoustic processing part 11 is identical with the feature value detected in a barge-in control part 14 described later. However, the feature value of the output from the acoustic processing part 11 may be different from the feature value detected in the barge-in control part 14.

Furthermore, the voice recognizing part 12 recognizes the contents of a user utterance in the detected user voice section by using various voice recognition techniques. A recognition result is output to the voice interacting part 13.

Next, the voice interacting part 13 outputs desired information to a user based on the voice recognition result in the voice recognizing part 12. As an output method (information transmission method), a voice output by a synthetic voice or the like, or a combination of a voice output and another information transmission unit is considered. "Another information transmission unit" refers to an information transmission unit based on, for example, an image, a voice, light, vibration, and the like.

Furthermore, when a barge-in function is determined to be effective by the barge-in control part 14, and the occurrence of barge-in is notified, the voice interacting part 13 immediately suspends the transmission of information to a user. Furthermore, if required, the voice interacting part 13 outputs information, regarding an information transmission section (voice output time) to a user, to the acoustic processing part 11.

Next, the barge-in control part 14 detects at least one feature value of an input of the acoustic processing part 11, an output thereof, or an external input, thereby determining whether or not barge-in is performed in the voice recognizing part 12, i.e., whether or not a barge-in function should be set to be effective. Herein, as the feature value, for example, a feature value of a noise signal, a S/N, positional information of a user, and the like are considered.

Furthermore, the barge-in control part 14 has a barge-in function. In the case where it is determined that the barge-in function is effective, the feature value of the output from the acoustic processing part 11 is compared with a predetermined threshold value, whereby rising (commencement of a voice input) of a voice signal input by a user is detected. Furthermore, in the case where it is determined that the barge-in function is effective, the barge-in control part 14 notifies the voice interacting part 13 of the occurrence of barge-in.

Figure 2:
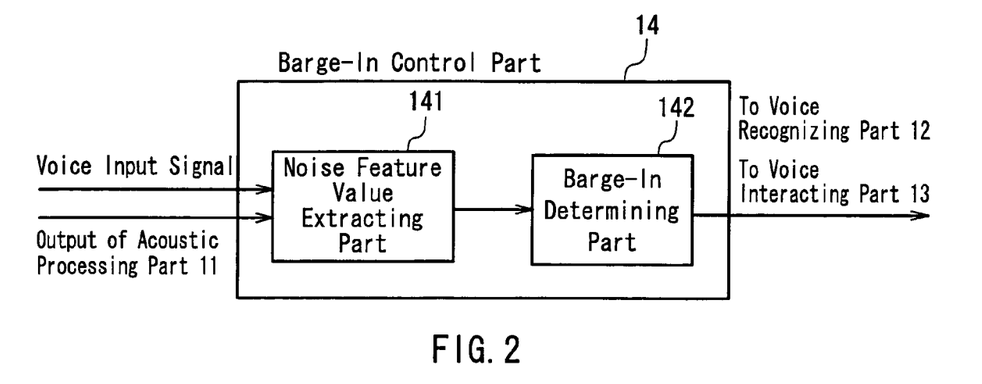
FIG. 2 is a view showing a configuration of a barge-in control part in the voice interactive system according to the embodiment of the present invention.

FIG. 2 shows a configuration of the barge-in control part 14 in the case where a feature value is that of a noise signal. In FIG. 2, the barge-in control part 14 receives at least one of a voice signal input by a user and a voice signal after being processed in the acoustic processing part 11.

The barge-in control part 14 includes a noise feature value extracting part 141 for detecting a noise feature value from the above-mentioned input, and a barge-in determining part 142 for comparing a feature value extracted in the noise feature value extracting part 141 with a predetermined threshold value to determine whether or not a barge-in function is set to be effective, and outputting a determination result to the voice recognizing part 12 and the voice interacting part 13, or the acoustic processing part 11, if required.

As the noise feature value detected in the noise feature value extracting part 141, for example, an amplitude value of noise obtained by digitizing a feature value of noise, or an average value or a change value thereof is considered. The noise feature value is not limited thereto. A power value, an amplitude spectrum value, or a power spectrum value may be used.

Furthermore, in the barge-in determining part 142, it is preferable that a predetermined threshold value to be compared with the noise feature value is set to be smaller than a predetermined threshold value to be compared with a feature value of an output from the acoustic processing part 11 used by a barge-in function of detecting rising (commencement of a voice input) of a voice signal input by a user. Otherwise, every time some voice signal (even in the case of only noise) is input in the course of output of a voice, a barge-in function becomes effective, which is inconvenient to a user.

Furthermore, in the case where a noise feature value exceeds the predetermined threshold value, it is determined that a noise level is high and the possibility of occurrence of unexpected barge-in is high, and the barge-in determining part 142 determines that a barge-in function should be set to be non-effective. The predetermined threshold value in the barge-in determining part 142 may be a fixed value, or a variable value varied dynamically in accordance with the condition.

Because of the above-mentioned configuration, the effectiveness of the barge-in function can be determined in accordance with the noise feature value detected in the barge-in control part 14, and unexpected barge-in caused by noise can be suppressed. In addition, erroneous recognition caused by the determination of a noise section as a user voice section can be avoided, and the malfunction of a voice interactive system can be prevented consequently.

Figure 3:
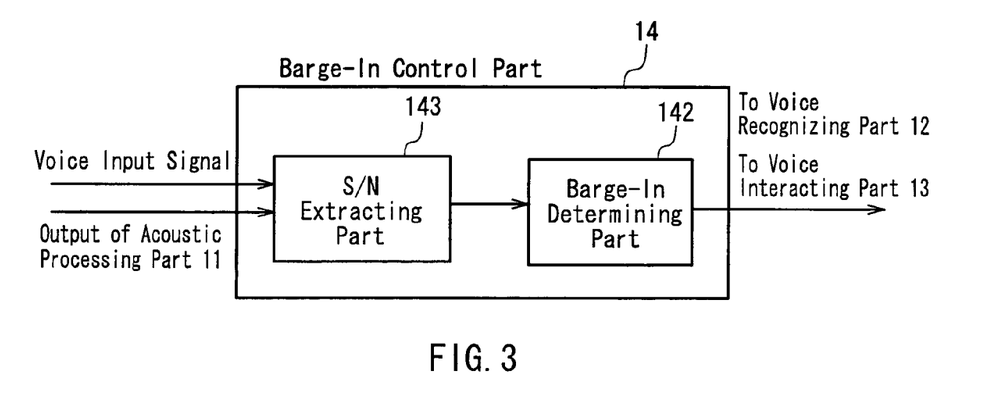
FIG. 3 is a view showing a configuration of the barge-in control part in the voice interactive system according to the embodiment of the present invention.

Similarly, FIG. 3 is a view showing a configuration of the barge-in control part 14 in the case where a feature value is a S/N (Sound/Noise). As shown in FIG. 3, the barge-in control part 14 receives at least one of a voice input signal input by a user and a voice signal processed in the acoustic processing part 11.

The barge-in control part 14 includes a S/N extracting part 143 for detecting a S/N from the above input, and a barge-in determining part 142 for comparing the S/N extracted in the S/N extracting part 143 with a predetermined threshold value to determine whether or not a barge-in function should be set to be effective, and outputting a determination result to the voice recognizing part 12 and the voice interacting part 13, or to the acoustic processing part 11, if required.

Furthermore, it is preferable that, in the barge-in determining part 142, a predetermined threshold value to be compared with a S/N is set to be larger than a predetermined threshold value to be compared with a feature value of an output of the acoustic processing part 11 used by the barge-in function of detecting rising (commencement of a voice input) of an input voice signal. Otherwise, every time non-stationary noise at a level higher than that of a user voice is input in the course of output of a voice, the barge-in function becomes effective, which is inconvenient to a user.

Furthermore, in the case where the S/N does not exceed the predetermined threshold value, it is determined that a S/N of a voice signal input by a user is low and the possibility of occurrence of unexpected barge-in due to non-stationary noise at a high level is high, and the barge-in determining part 142 determines that the barge-in function should be set to be non-effective. The predetermined threshold value in the barge-in determining part 142 may be a fixed value, or a variable value varied dynamically in accordance with the condition.

Because of the above-mentioned configuration, the effectiveness of the barge-in function can be determined in accordance with the S/N detected in the barge-in control part 14, and unexpected barge-in caused by non-stationary noise at a level higher than that of a user voice can be suppressed. In addition, erroneous recognition caused by the determination of a noise section as a user voice section can be avoided, and the malfunction of a voice interactive system can be prevented consequently.

Figure 4:
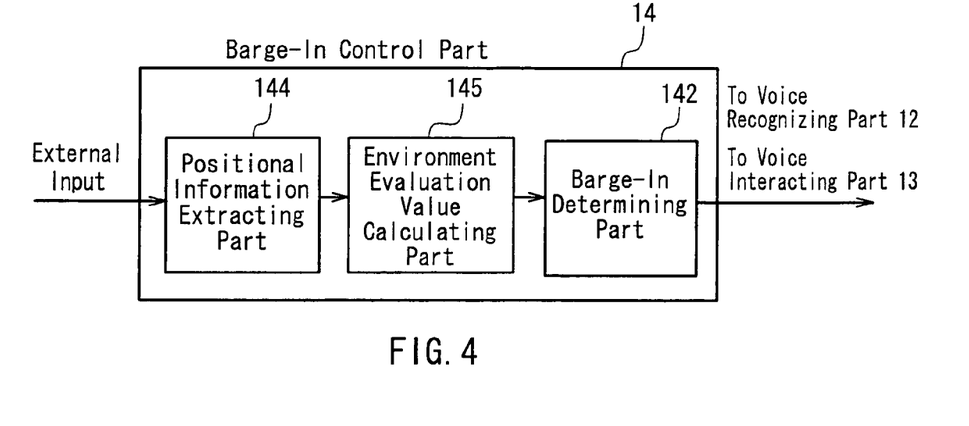
FIG. 4 is a view showing a configuration of the barge-in control part in the voice interactive system according to the embodiment of the present invention.

Similarly, FIG. 4 is a view showing a configuration of the barge-in control part 14 in the case where a feature value is positional information of a user. As shown in FIG. 4, the barge-in control part 14 receives an external input different from a voice input by a user. For example, the external input is positional information from GPS or the like.

The barge-in control part 14 includes a positional information extracting part 144 for detecting the positional information of a user from the above-mentioned input, an environment evaluation value calculating part 145 for calculating an evaluation value of a peripheral environment based on the positional information of a user extracted in the positional information extracting part 144, and a barge-in determining part 142 for comparing an evaluated value calculated in the environment evaluation value calculating part 145 with a predetermined threshold value to determine whether or not a barge-in function should be set to be effective, and outputting a determination result to the voice recognizing part 12 and the voice interacting part 13, or to the acoustic processing part 11, if required.

The positional information extracting part 144 shown in FIG. 4 obtains a position coordinate of a user obtained by, for example, GPS or the like from an external input. The environment evaluation value calculating part 145 calculates a predetermined environment evaluation value by comparing the position coordinate of a user extracted in the positional information extracting part 144 with environmental information such as previously recorded map information. The barge-in determining part 142 determines whether or not the barge-in function should be set to be effective based on the calculated environment evaluation value. Herein, as the map information, an area information database or the like is considered, in which an area expected to have a lot of environment noise (e.g., in the vicinity of a highway, etc.) is registered as a high-noise area, and an area with few environment noise (quiet residential area, etc.) is registered as a low-noise area. The map information is not limited thereto.

As an environment evaluation value, an expected value of environment noise in a peripheral environment, and the like are considered. More specifically, the peripheral environment of the current user's position can be assumed from the position coordinate of the user. For example, when the expected value of the environment noise in the peripheral environment exceeds a predetermined threshold value, it is determined that the user is at a position with large environment noise, and the possibility of occurrence of unexpected barge-in is high. Consequently, the barge-in determining part 14 determines that the barge-in function should be set to be non-effective. A predetermined threshold value in the barge-in determining part 142 may be fixed value or a variable value varied dynamically in accordance with the condition.

Because of the above-mentioned configuration, it can be determined whether or nor the barge-in function should be set to be effective in accordance with the environment evaluation value calculated based on the positional information of a user detected in the barge-in control part 14. Consequently, unexpected barge-in caused by environment noise due to the peripheral environment of a user can be suppressed. In addition, erroneous recognition caused by the determination of a noise section as a user voice section can be avoided, and the malfunction of a voice interactive system can be prevented consequently.

The above-mentioned three feature value extracting units may be combined. More specifically, the noise feature value extracting part 141, the S/N extracting part 143, and the positional information extracting part 144 are provided in the barge-in control part 14, and the comparison between the each noise feature value with a threshold value A, the comparison between each S/N and a threshold value B, and the comparison between each evaluation value based on the positional information of a user and a threshold value C are performed to determine whether or not the barge-in function should be set to be effective. In the present embodiment, the case where three kinds of feature value extracting units are provided has been described. However, three or more kinds of units may be provided, and any two of three kinds may be provided.

By using different kinds of feature value extracting units as described above, it can be expected that the precision of determining whether or not the barge-in function should be set to be effective is enhanced, and unexpected barge-in and the erroneous recognition caused by determining a noise section as a user voice section can be suppressed more effectively.

Figure 5:
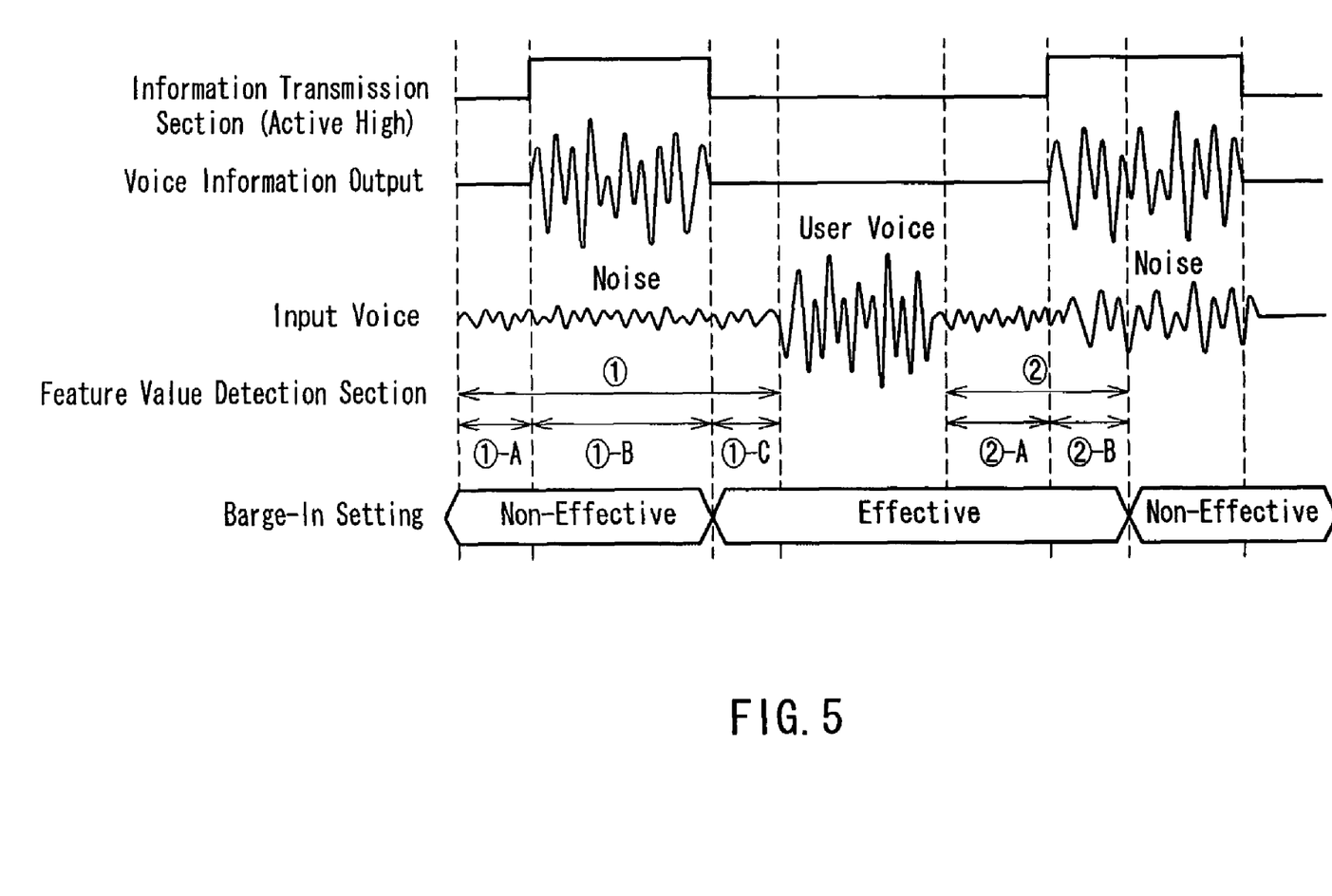
FIG. 5 is a view illustrating the control of effectiveness of a barge-in function in the voice interactive system according to the embodiment of the present invention.

Hereinafter, specific processing will be described with reference to the drawings, exemplifying the case of using a feature value of a noise signal. FIG. 5 is a view showing an input/output state in the case where a barge-in function is set to be non-effective in the voice recognizing part 12 in an initial state and an effective/non-effective state of the barge-in function in the voice interactive system according to the embodiment of the present invention.

In FIG. 5, the barge-in control part 14 detects a noise feature value in a section excluding a user's voice input section, and determines whether or not a barge-in function is effective in accordance with the noise feature value.

Herein, in the case where the barge-in function is set to be non-effective in an initial state, at least in a section from a time immediately after a user starts accessing the voice interactive system to a time when the transmission of information through a voice output in the voice interacting part 13 is completed (i.e., a section ①-A and a section ①-B in FIG. 5), the barge-in function is set to be non-effective irrespective of the noise feature value. More specifically, immediately after the user starts accessing the voice interactive system, a noise level is unknown to the voice interactive system. Therefore, for the purpose of preventing the occurrence of unexpected barge-in due to noise and the like, the barge-in function is set to be non-effective in the section ①-A and the section ①-B.

Furthermore, the noise feature value detected in the barge-in control part 14 is detected in the section ①-A and the section ①-C in a section ①. This is because, in these sections, a noise feature value of environment noise, line network noise, and the like can be detected exactly. On the other hand, in the second ①-B, a noise feature value of the environment noise, line network noise, and the like superimposed with a residual line echo, a residual acoustic echo, and the like is detected, so that there is a possibility that exactness of detection may be lost.

The section for detecting a noise feature value is not limited to the entire section ①. For example, the section for detecting a noise feature value may be any one of the sections ①-A, ①-B, and ①-C, or may be limited to a part of the sections ①-A, ①-B, and ①-C.

The barge-in control part 14 compares the noise feature value in the section ① with a predetermined threshold value. In the case where the noise feature value exceeds a predetermined threshold value, it is determined that a noise level is high, and the possibility of occurrence of unexpected barge-in is high, and the barge-in function is set to be non-effective. FIG. 5 shows the case where the noise feature value does not exceed a predetermined threshold value, and the barge-in control part 14 sets the barge-in function to be effective.

In FIG. 5, the barge-in control part 14 sets the barge-in function in the voice recognizing part 12 to be effective/non-effective after the completion of the section ①-B. However, the setting timing of the barge-in function is not limited thereto. The barge-in function may be set to be effective/non-effective at any position in the section ①.

Next, the barge-in control part 14 does not detect a feature value in a user's voice input section, and keeps the barge-in function in a state set after the completion of the section ①-B (i.e., keeps the barge-in function to be effective). The reason for this is as follows. While a user's voice input is being performed, a voice input is superimposed with noise. Regarding the noise feature value in the barge-in control part 14, it is difficult to detect only the feature value of noise. Therefore, the barge-in function is set to be effective in the section ①-C in which only the feature value of noise can be detected.

In the case where the barge-in function is set to be effective, a voice output is started in the voice interacting part 13 after the completion of a user's voice input, a noise feature value is detected in the section ② after the passage of a predetermined time. In the case where the noise feature value exceeds a predetermined threshold value, the barge-in function is set to be non-effective as shown in FIG. 5.

The section for detecting a noise feature value is set to be the section ②; however, for example, it may be limited to either of the section ②-A or the section ②-B or limited to a part of the section ②-A and ②-B. In the section ②, the section ②-B after the passage of a predetermined time from the commencement of a voice output from the voice interacting part 13 may be set from a time when a voice output from the voice interacting part 13 starts to a time immediately before the commencement of a user's voice input (including the case of barge-in), or set to be a predetermined time length. In the latter case, the predetermined time length is set, expecting a shorter section than a section in which a voice output is started from the voice interacting part 13 and barge-in occurs by a user's voice input.

Figure 6:
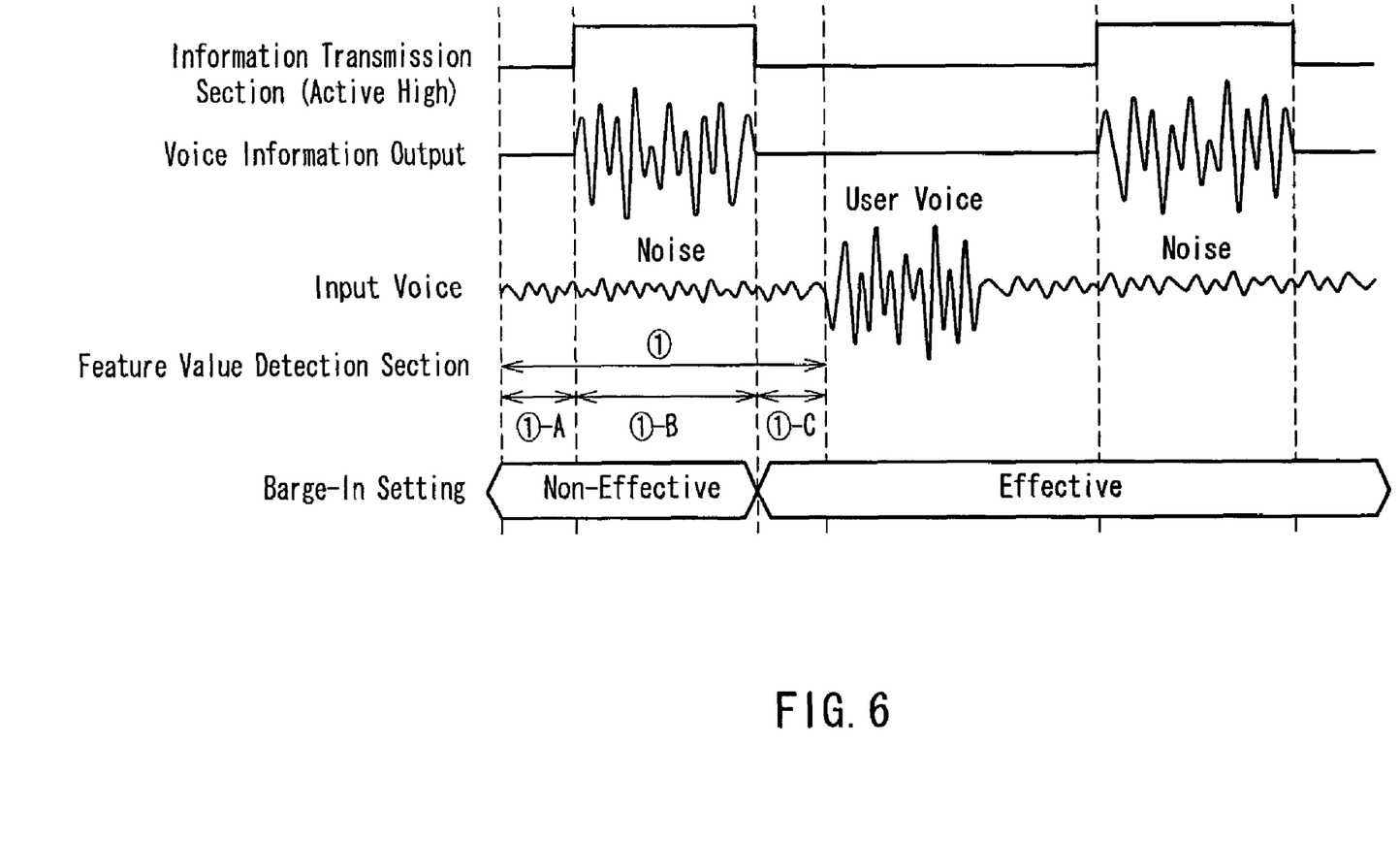
FIG. 6 is a view illustrating the control of effectiveness of a barge-in function in the voice interactive system according to the embodiment of the present invention.
Figure 7:
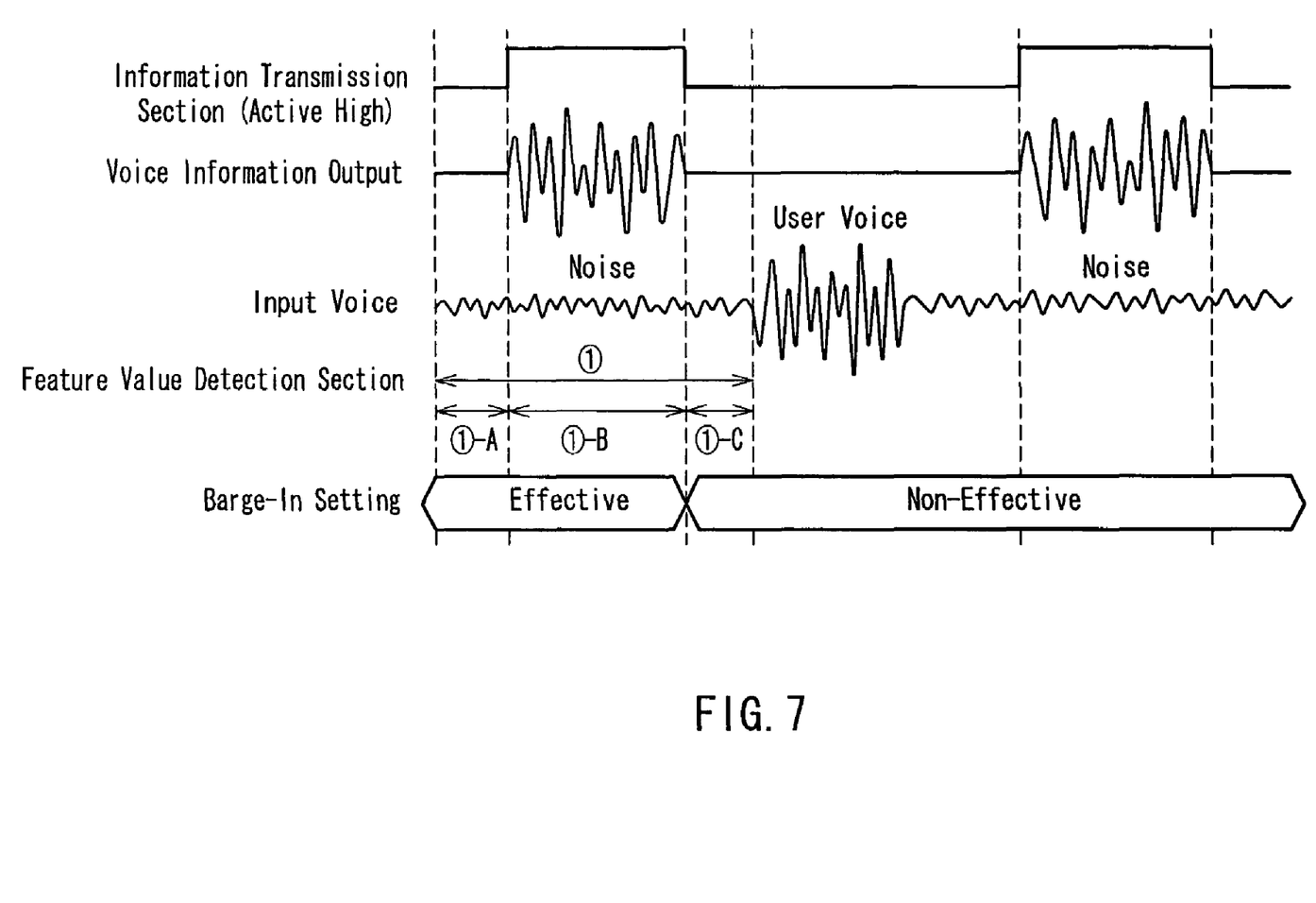
FIG. 7 is a view illustrating the control of effectiveness of the barge-in function in the voice interactive system according to the embodiment of the present invention.

Furthermore, instead of dynamically switching the effectiveness of the barge-in function in accordance with the situation as shown in FIG. 5, the following may also be considered. For example, as shown in FIG. 6, the barge-in function is set to be non-effective in an initial state, and is switched to be effective only once in the case where the condition is satisfied. Alternatively, as shown in FIG. 7, the barge-in function is set to be effective in an initial state, and is switched to be non-effective only once in the case where the condition is satisfied.

Herein, if the barge-in function is set to be non-effective in an initial state, when a user accesses the voice interactive system, the occurrence of unexpected barge-in can be prevented with respect to various noises at an unknown level.

As shown in FIG. 6, the barge-in control part 14 determines that the noise level is low and the possibility of occurrence of unexpected barge-in is low, in the case where the noise feature value in the section ① does not exceed a predetermined threshold value, for example, and sets the barge-in function to be effective and fixes it in an effective state. In FIG. 6, the barge-in function is set to be effective after the completion of the section ①-B. However, the barge-in function is not necessarily required to be effective at this position. The barge-in function may be set to be effective at any position in the section ①.

Furthermore, setting the barge-in function to be effective in an initial state has an advantage in that an interrupt can be performed at a timing desired by a user even in the course of the transmission of information through a voice output from the voice interactive system.

The barge-in control part 14 determines that the noise level is high and the possibility of occurrence of unexpected barge-in is high in the case where the noise feature value in the section ① exceeds a predetermined threshold value, for example, and sets the barge-in function to be non-effective and fixes it in a non-effective state. In FIG. 7, the barge-in function is set to be non-effective after the completion of the section ①-B. However, the barge-in function is not necessarily required to be set to be non-effective at this position. The barge-in function may be set to be non-effective in the course of the section ①.

Thus, by switching the barge-in function only once from an initial state, the malfunction of the voice interactive system can be prevented, and the configuration of the barge-in control part 14 can be simplified, which enables the cost of the entire voice interactive system to be reduced.

In the case of using the above-mentioned adaptive filter, the following problem should be noted. More specifically, an adaptive filter is generally predicated on the fact that a voice signal to be input and a reference voice signal have a low correlation, and a FIR filter coefficient is successively updated by adaptive processing using an adaptive algorithm. However, an actual input voice is not limited to only an echo voice, and in some cases, the actual input voice may be superimposed with a user voice. In this case, the correlation between the voice signal to be input and the reference voice signal is increased because of the return of the same voice and the like. Therefore, in the case where the acoustic processing part 12 is provided with an adaptive filter, a filter coefficient is updated to an erroneous value by adaptive processing. This reduces an effect of suppressing an echo, and distorts a voice input by a user, and consequently, the contents of a voice input by a user cannot be recognized.

Thus, in the case where the barge-in function is set to be non-effective, it is necessary that an adaptive processing section by the adaptive filter is limited to a voice information transmission section in which a voice is output from the voice interacting part 13, so that adaptive processing is not performed in the non-voice information transmission section.

Because of this, barge-in does not occur in the information transmission section in which a voice is output from the voice interacting part 13. Therefore, a user input voice is not superimposed with an echo voice, and the adaptive processing and the update of an adaptive filter coefficient are performed normally. In addition, only an echo voice that is noise can be suppressed without distorting a user's input voice.

Furthermore, in the case where the acoustic processing part 11 is composed of an adaptive filter, when the barge-in function is set to be effective, the adaptive processing by the adaptive filter and the update of an adaptive filter coefficient are performed only in a section from the commencement of a voice output from the voice interacting part 13 to a predetermined time.

Herein, the "predetermined time" may be, at most, a time between the commencement of a voice output from the voice interacting part 13 and the commencement of barge-in by a user's voice input, or a previously set time. In the latter case, the predetermined time needs to be set, assuming a time before the commencement of barge-in by the voice input by a user.

Thus, the adaptive processing in the acoustic processing part 11 and the update of an adaptive filter coefficient are performed only in a section from the commencement of a voice output from the voice interacting part 13 to the occurrence of barge-in by a user. Therefore, a user voice is not superimposed with an echo voice that is noise, and the adaptive processing and the update of an adaptive filter coefficient are performed normally, and only an echo voice that is noise can be suppressed without distorting a user input voice.

Figure 8:
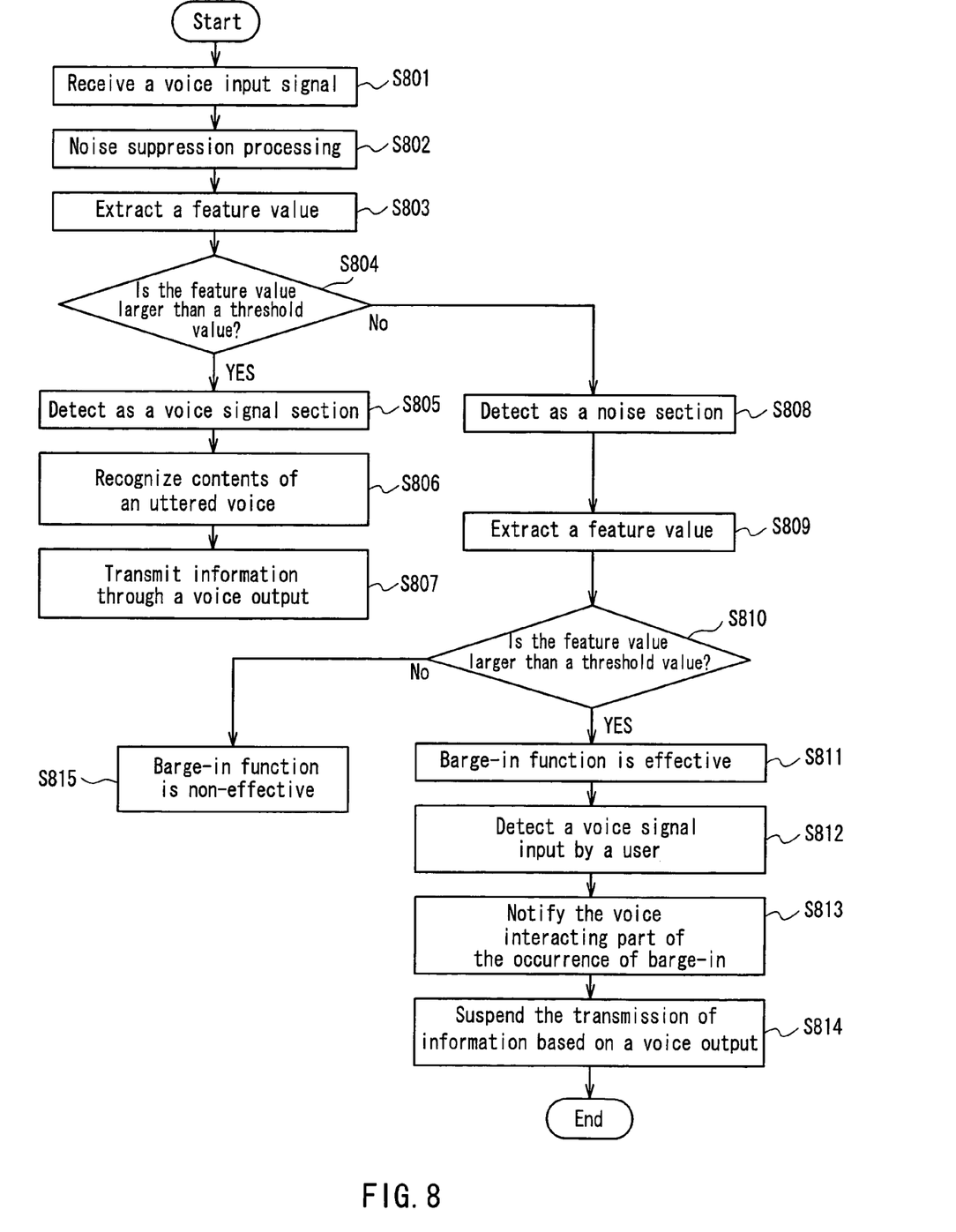
FIG. 8 is a flow chart illustrating the processing in the voice interactive system according to the embodiment of the present invention.

Next, a processing flow of a program for realizing a voice interactive system according to the embodiment of the present invention will be described. FIG. 8 is a flow chart illustrating the processing of a program for realizing the voice interactive system according to the embodiment of the present invention.

In FIG. 8, first, a voice signal input by a user is received (Operation 801), and acoustic signal processing is performed to suppress various noises contained in the voice signal (Operation 802).

Next, a feature value of the voice signal with the noises suppressed is extracted (Operation 803), and the extracted feature value is compared with a predetermined threshold value (Operation 804). In the case where the feature value is larger than a predetermined threshold value (Operation 804: Yes), the corresponding section is detected as a user's voice signal section (Operation 805). In the case where the feature value is equal to or less than a predetermined threshold value (Operation 804: No), the corresponding section is detected as a noise signal section (Operation 808).

Regarding the section detected as the user's voice signal section, the contents of an uttered voice are recognized by using various voice recognition techniques (Operation S806). Then, the information to be transmitted to the user, corresponding to the recognition result. is transmitted to the user through a voice output (Operation 807).

On the other hand, regarding the section detected as the noise signal section, at least one feature value is extracted (Operation 809). The extracted feature value is compared with a predetermined threshold value (Operation 810). In the case where the feature value is larger than the predetermined threshold value (Operation 810: Yes), the barge-in function is set to be effective (Operation 811). In the case were the feature value is equal to or smaller than the predetermined threshold value (Operation 810: No), the barge-in function is set to non-effective (Operation 815). Depending upon the kind of the feature value, the barge-in function is set to be effective in the case where the feature value does not exceed the predetermined threshold value, and the barge-in function is set to be non-effective in the case where the feature value exceeds the predetermined threshold value.

Next, in the case where the barge-in function is effective (Operation 811), feature values of successively input voice signals with noises suppressed are compared with a predetermined threshold value to detect the commencement of a voice input by a user (Operation 812). Simultaneously, the voice interacting part 13 is notified of the occurrence of barge-in (Operation 813).

When it is determined that the barge-function is effective (Operation 811), and the voice interacting part 13 is notified of the occurrence of barge-in (Operation 813), a voice output to a user is suspended (Operation 814).

Figure 9:
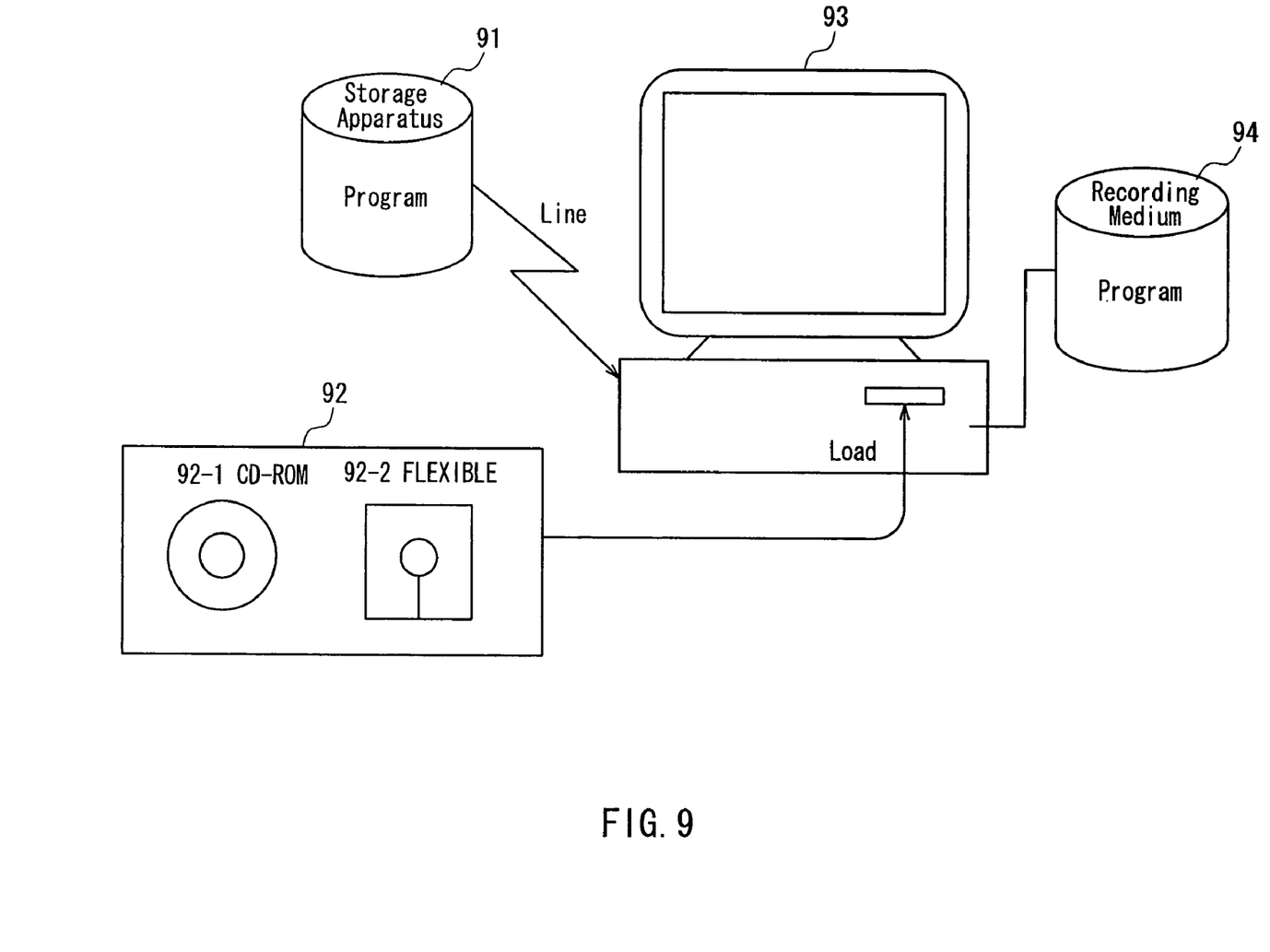
FIG. 9 is a view illustrating a computer environment.

A program for realizing the voice interactive system according to the embodiment of the present invention is stored not only in a portable recording medium 92 such as a CD-ROM 92-1 and a flexible disk 92-2 as shown in FIG. 9, but also in any of another storage apparatus 91 provided at the end of a communication line and a recording medium 94 such as a hard disk and a RAM of a computer 93. In execution, the program is loaded, and executed on a main memory.

Furthermore, threshold value data and the like for determining the effectiveness of the barge-in function corresponding to each feature value obtained by the voice interactive system according to the embodiment of the present invention may also be stored not only in a portable recording medium 92 such as a CD-ROM 92-1 and a flexible disk 92-2 as shown in FIG. 9, but also in any of another storage apparatus 91 provided at the end of a communication line and a recording medium 94 such as a hard disk and a RAM of a computer 93. For example, such data is read by the computer 93 using the voice interactive system according to present invention.

Thus, according to the voice interactive system of the present invention, it is possible to determine the effectiveness of the barge-in function in accordance with various feature values detected in the barge-in control part, and unexpected barge-in caused by noise and an echo can be suppressed. In addition, erroneous recognition caused by determining a noise section as a user voice section can be avoided, so that the malfunction of the voice interactive system can be prevented.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A voice interactive system, comprising:
   an acoustic processing part performing acoustic signal processing with respect to an input voice signal;
   a voice recognizing part recognizing contents of a voice contained in the voice signal after being subjected to the acoustic signal processing;
   a voice interacting part transmitting information to a user through a voice output or a combination of the voice output and another information transmission unit based on the contents of the voice; and
   a barge-in control part having a barge-in function of suspending transmission of information by an input or an output of the acoustic processing part or an input signal from an external input in the course of transmission of information, wherein:
   the barge-in control part detects one or more feature values from an input or an output of the acoustic processing part, or an input signal from the external input, and determines whether or not the barge-in function is set to be effective based on the one or more feature values, the one or more feature values including positional information of the user detected from the input signal from the external input, and
   the barge-in control part calculates an environment evaluation value of a position of the user by comparing the position of the user with previously recorded map information that represents noise levels in a plurality of areas, and determines the barge-in function to be non-effective in a case where the environment evaluation value exceeds a predetermined threshold value.

2. The voice interactive system according to claim 1, wherein the one or more feature values further include a noise feature value, and the barge-in function is set to be non-effective in a case where the noise feature value exceeds a predetermined threshold value.

3. The voice interactive system according to claim 1, wherein the one or more feature values further include a signal to noise ratio of the voice signal, and the barge-in function is set to be effective in the case where the signal to noise ratio of the voice signal exceeds a predetermined threshold value.

4. The voice interactive system according to claim 1, wherein the voice interacting part notifies the user of an effective/non-effective state of the barge-in function using at least one of a voice and another information transmission unit.

5. A voice interactive method, comprising:
   performing acoustic signal processing with respect to an input voice signal and producing a processed, output signal;
   recognizing contents of a voice contained in the processed, output signal, after the input voice signal has been subjected to the acoustic signal processing;
   transmitting information to a user through a voice output or a combination of the voice output and another information transmission unit based on the contents of the voice; and
   determining whether a barge-in function of suspending transmission of information by an input or an output in the performing acoustic signal processing or an input signal from an external input in the transmission information to a user is set to be effective or non-effective, wherein, in the determining:
   one or more feature values are detected from the input voice signal or the processed, output signal or the input signal from the external input, and whether or not the barge-in function is set to be effective is determined based on the one or more feature values, the one or more feature values including positional information of the user detected from the input signal from the external input,
   an environment evaluation value of a position of the user is calculated, based on the positional information and environmental information on the position, and
   the barge-in function is determined to be non-effective in the case where the environment evaluation value exceeds a predetermined threshold value by comparing the position of the user with previously recorded map information that represents noise levels in a plurality of areas.

6. A recording medium encoded with a computer-executable program for realizing a voice interactive method, the program causing the computer to execute:
   performing acoustic signal processing with respect to an input voice signal and producing a processed, output signal;
   recognizing contents of a voice contained in the processed, output signal after the input voice has been subjected to the acoustic signal processing;
   transmitting information to a user through a voice output or a combination of the voice output and another information transmission unit based on the contents of the voice; and
   determining whether a barge-in function of suspending transmission of information by an input or an output in the acoustic signal processing or an input signal from an external input the transmitting information to a user is set to be effective or non-effective, wherein, in the, determining:
   one or more feature values are detected from the input voice signal or the processed, output signal or the input signal from the external input, and whether or not the barge-in function is set to be effective is determined based on the one or more feature values, and the one or more feature values include positional information of the user detected from the input signal from the external input, and
   an environment evaluation value of a position of the user is calculated based on the positional information and environmental information on the position, and the barge-in function is determined to be non-effective in the case where the environment evaluation value exceeds a predetermined threshold value by comparing the position of the user with previously recorded map information that represents noise levels in a plurality of areas.

* * * * *